Nov. 27, 1962 C. F. GROMME 3,065,699
LOW PRESSURE FUEL DISTRIBUTION SYSTEM
Filed Sept. 10, 1959 4 Sheets-Sheet 1

INVENTOR.
CARL F. GROMME,
BY Allen & Allen
ATTORNEYS.

Nov. 27, 1962 C. F. GROMME 3,065,699
LOW PRESSURE FUEL DISTRIBUTION SYSTEM
Filed Sept. 10, 1959 4 Sheets-Sheet 2
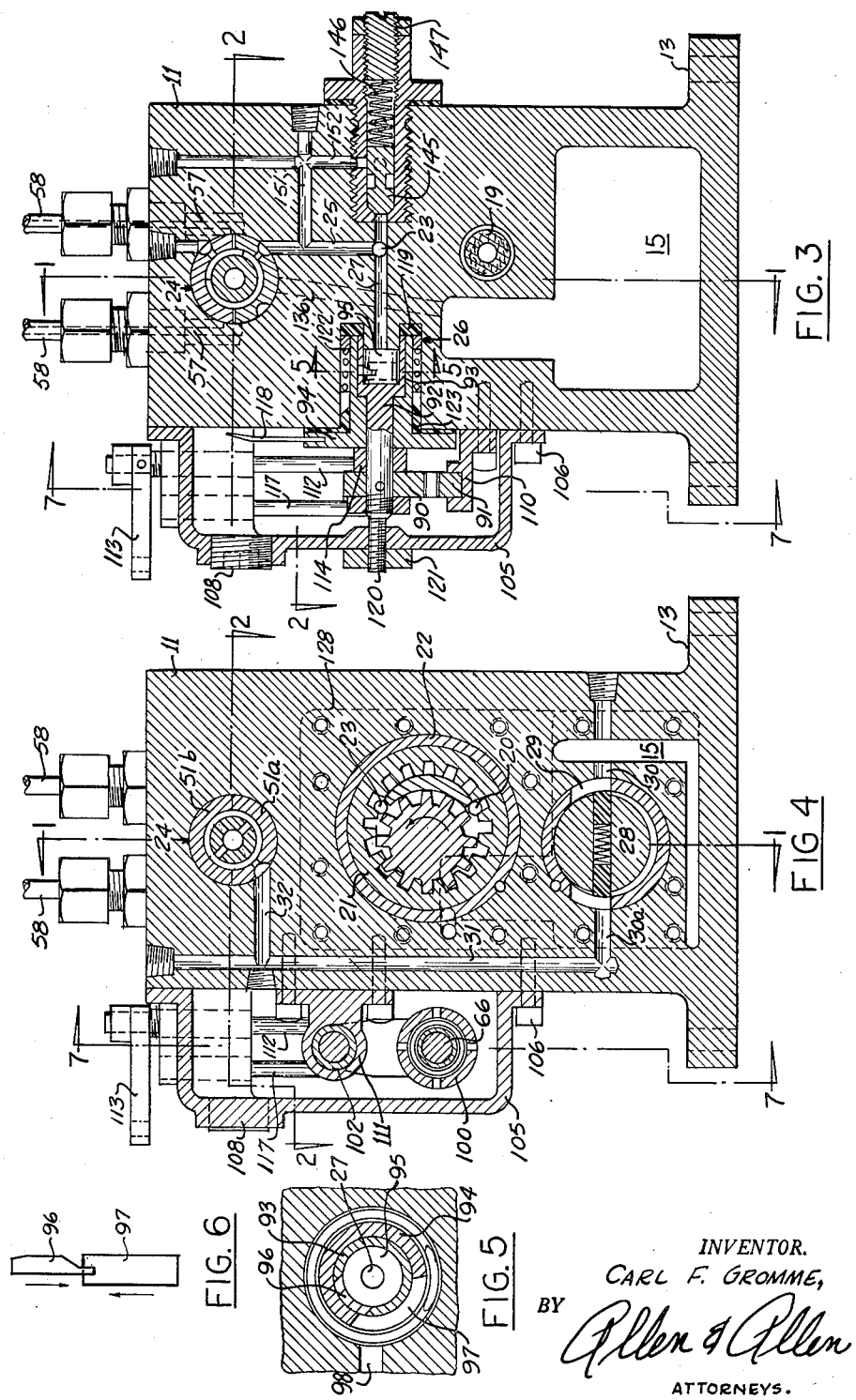
INVENTOR.
CARL F. GROMME,
BY
Allen & Allen
ATTORNEYS.

Nov. 27, 1962   C. F. GROMME   3,065,699
LOW PRESSURE FUEL DISTRIBUTION SYSTEM
Filed Sept. 10, 1959   4 Sheets-Sheet 3
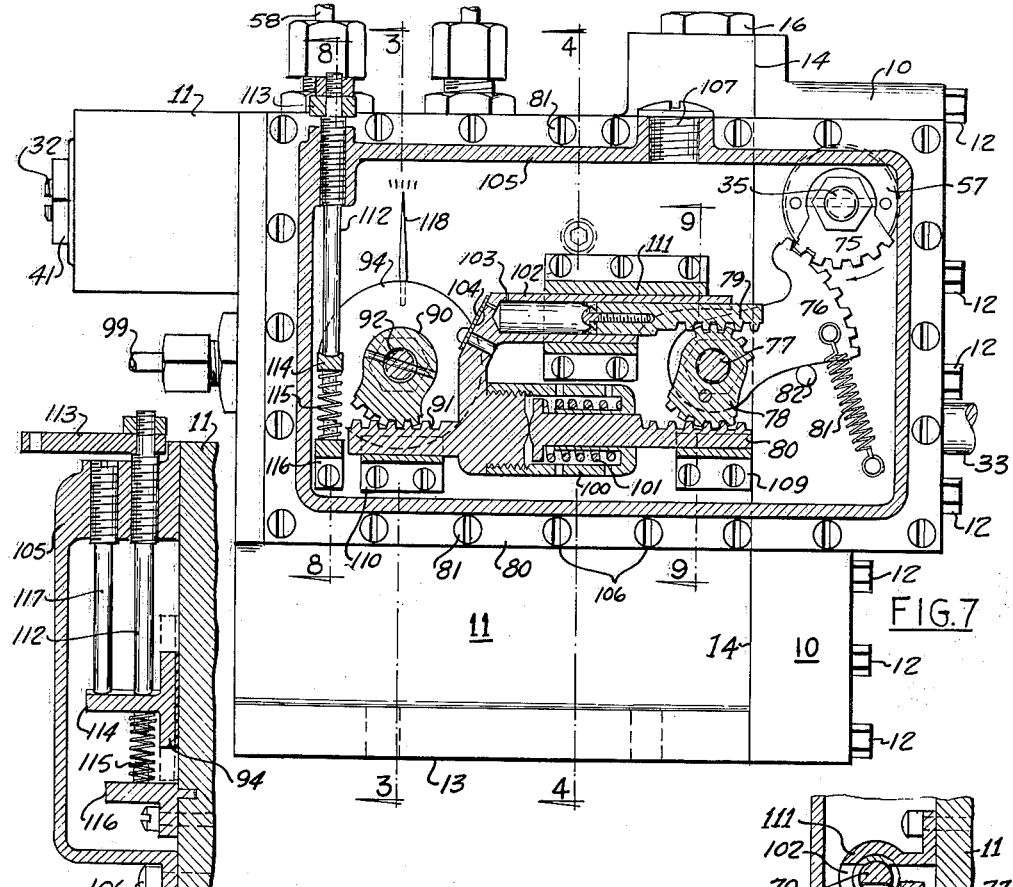
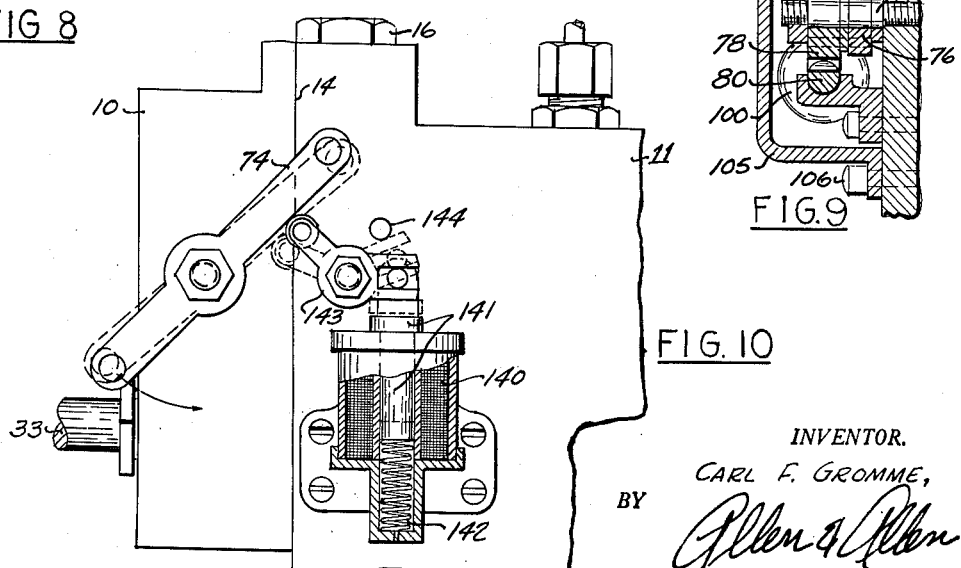
INVENTOR.
CARL F. GROMME,
BY
ATTORNEYS.

Nov. 27, 1962  C. F. GROMME  3,065,699
LOW PRESSURE FUEL DISTRIBUTION SYSTEM
Filed Sept. 10, 1959  4 Sheets-Sheet 4
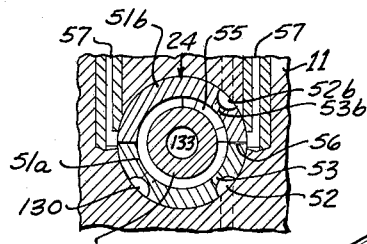
FIG.17
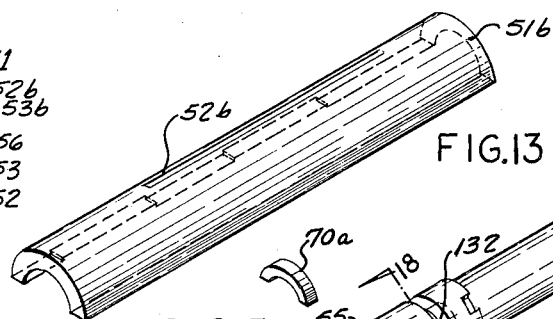
FIG.13
FIG.15
FIG.11
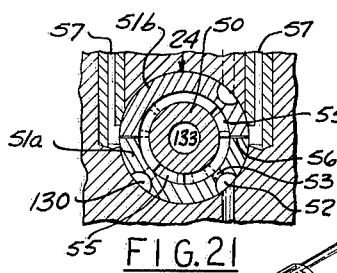
FIG.21
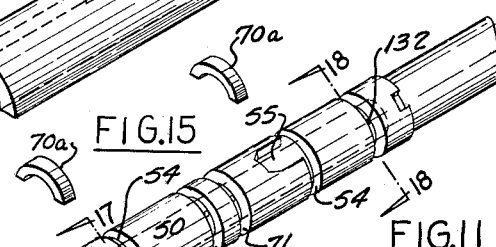
FIG.14
FIG.12
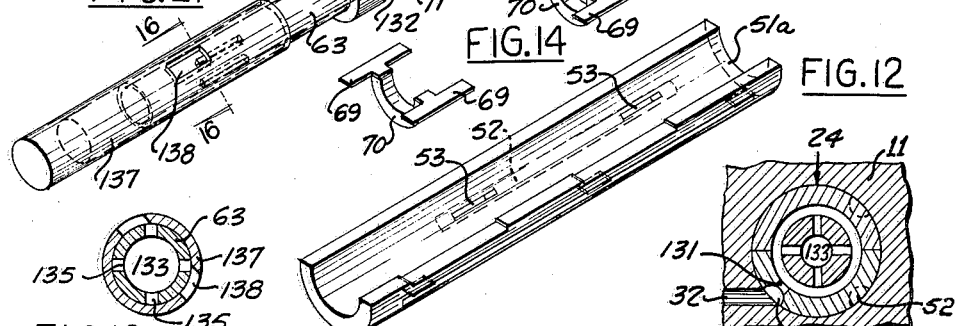
FIG.16
FIG.18
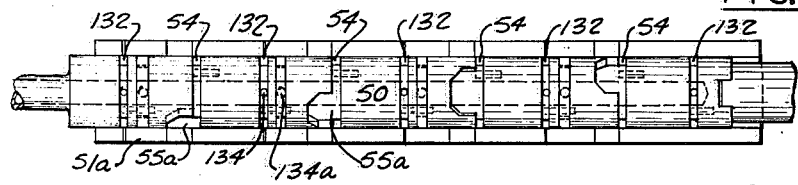
FIG.19
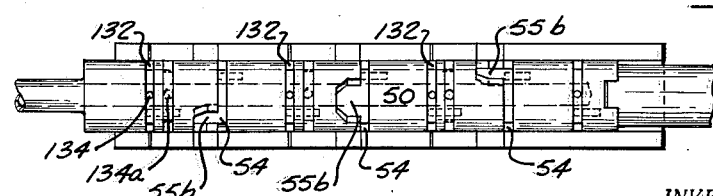
FIG.20
INVENTOR.
CARL. F. GROMME,
BY
ATTORNEYS.

United States Patent Office 3,065,699
Patented Nov. 27, 1962

3,065,699
LOW PRESSURE FUEL DISTRIBUTION SYSTEM
Carl F. Gromme, Box 654, Kentfield, Calif.
Filed Sept. 10, 1959, Ser. No. 839,096
14 Claims. (Cl. 103—2)

This invention relates to a fuel distribution system and more particularly to a device for mechanically distributing measured increments of liquid fuel under controlled pressure to the combustion chambers of an internal combustion engine in a properly timed sequence. The instant invention may be utilized to deliver liquid fuel directly to the cylinders of the engine or to its air induction system or fuel injection nozzles.

The invention relates to that class of fuel distribution devices wherein the flow of fuel is controlled by a rotor the rotation of which delivers measured quantities of fuel to the engine cylinders in proper sequence. In such devices, a fuel pump or its equivalent is provided to supply the fuel to the rotor; and in order to deliver the proper quantity of fuel required for a particular operating condition, it is necessary to synchronize the operation of the rotor and pump so as to deliver the fuel in varying amounts. For example, various operating conditions such as cold starting, warm up, idling, acceleration, deceleration, and steady running at various engine speeds each present a different fuel requirement. In order to meet these varying requirements, numerous expedients have hitherto been employed to selectively control and correlate the rate of rotation of the rotor and the rate of delivery of fuel to the rotor by the fuel pump in accordance with the demands of the engine; and numerous difficulties have been hitherto encountered in synchronizing the operation of the rotor and fuel pump to provide the proper quantities of fuel under all operating conditions. This is particularly true of situations requiring disproportionate quantities of fuel relative to a given rotor setting, as would be required for rapid acceleration, cold starting and the like.

In accordance with the instant invention, the rotation of the rotor is timed to the crankshaft speed of the engine being operated and the supply of fuel to the rotor is controlled by a constant volume pump which is also synchronized to the speed of rotation of the engine crankshaft. Thus, the rotor and pump are driven in timed relation and the supply of fuel to the rotor is varied, under normal operating conditions, in direct proportion to increases or decreases in engine speed. However, in order to meet fuel demands of the engine which are disproportionate to the capacity of the constant volume pump at a given speed of rotation—as would be encountered during rapid acceleration—a secondary or by-pass fuel system is provided which, operating in conjunction with the primary fuel system (the constant volume pump), permits the delivery of the exact quantity of fuel required for the operating condition encountered.

Accordingly, it is a principal object of the present invention to provide a low pressure fuel distribution system wherein the flow of fuel to the engine is controlled by a rotor driven in timed relation to the crankshaft speed of the engine, the rotor being supplied with fuel by the co-action of a primary and a secondary or by-pass fuel supply system.

A further object of the invention is the provision of a fuel distribution system of the character described wherein the rotor is also axially movable to further regulate the quantity of fuel delivered to the engine, such axial movement of the rotor being coordinated with the operation of the primary and the secondary or by-pass fuel system so that the rotor will receive and release the exact quantity of fuel required in its adjusted position.

Still a further object of the invention is to operatively connect both the primary fuel system and the by-pass system mechanically to a throttle control for unitary and substantially automatic operation.

Still a further object of the instant invention is the provision of a fuel distribution device of the character described incorporating an integral lubricating system utilizing a lubricating medium such as oil.

The foregoing together with other objects of the instant invention which will appear hereinafter, or which will be apparent to one skilled in the art upon reading these specifications, I accomplish by those constructions and arrangements of parts of which I shall now describe certain exemplary embodiments.

Reference is now made to the accompanying drawings wherein:

FIGURE 3 is a cross sectional view taken on line 3—3 of FIGURES 1 or 7.

FIGURE 4 is a cross sectional view taken on line 4—4 of FIGURES 1 or 7.

FIGURE 5 is a sectional detail on an enlarged scale taken on line 5—5 of FIGURE 3.

FIGURE 6 is a detail diagram on an enlarged scale of the by-pass ports (shown in FIGURE 5) as developed on a plane surface.

FIGURE 7 is a sectional view, taken on line 7—7 of FIGURES 2, 3, or 4.

FIGURE 8 is a partial cross sectional view taken on line 8—8 of FIGURE 7.

FIGURE 9 is a partial cross sectional view taken on line 9—9 of FIGURE 7.

FIGURE 10 is a partial side elevational view of the mechanism.

FIGURES 11, 12, 13, 14 and 15 form an exploded isometric view of the parts making up the rotor assembly members.

FIGURE 16 is a sectional view on an enlarged scale taken on line 16—16 of FIGURE 11.

Figure 1:
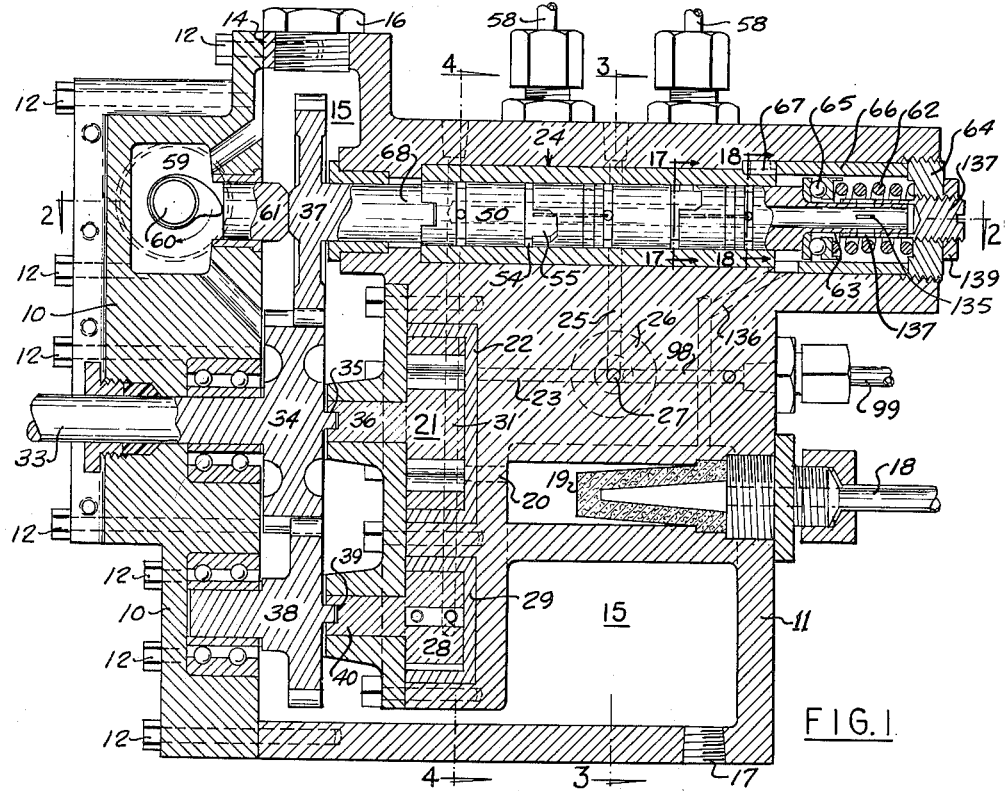
FIGURE 1 is a vertical section of the entire mechanism taken on line 1—1 of FIGURE 2.

FIGURE 17 is a sectional view on an enlarged scale taken on line 17—17 of FIGURE 1.

FIGURE 18 is a sectional detail on an enlarged scale taken on line 18—18 of FIGURE 1.

FIGURE 19 is a plan view of a distributing rotor for an eight cylinder engine.

FIGURE 20 is a plan view of a distributing rotor for a six cylinder engine.

FIGURE 21 is a sectional view on an enlarged scale similar to FIGURE 17 but illustrating a modified pocket arrangement for a two cycle engine.

Briefly, in the practice of the invention, the fuel, which may be gasoline, alcohol or the like, is delivered to the device from any suitable source of supply and passes directly to a fuel pump of the constant delivery type, the pump being driven in timed relation to the engine crankshaft. The output of the fuel pump is divided, a portion of the fuel being fed directly to the rotor through a primary fuel duct and the remainder fed through a by-pass duct to a by-pass valve the outlet side of which is arranged to return by-passed fuel to the inlet side of the fuel pump for re-circulation. With this arrangement, the quantity of fuel delivered to the rotor through the primary fuel system can be varied as desired by varying the quantity of fuel passed through the by-pass valve; and consequently the quantity of fuel delivered to the rotor may be varied even though the output of the fuel pump is constant.

The fuel delivered to the rotor through the primary fuel duct is received in pockets spaced about the periphery of the rotor, the pockets being arranged so that, as the rotor rotates, they will be sequentially brought into communication with outlet ports which deliver the fuel to the engine cylinders. The arrangement of parts is such that the size of the outlet ports will be changed as the rotor is moved axially—which occurs as the control throttle is advanced—and as the rotor is moved axially, the by-pass valve will be opened or closed by a proportionate amount, thereby delivering the amount of fuel required for the particular setting of the rotor. The throttle is arranged to control both the movement of the rotor and the by-pass valve, but in addition separate means are provided to actuate the by-pass valve independently of the throttle—such means being effective to enrich the fuel and supply additional fuel during periods of special demand, such as during cold starting and the like.

Since liquids such as gasoline offer little or no lubrication qualities, mechanical wear in the distribution system becomes a difficult problem. In the instant device, an oil reservoir and oil pump form an integral part of the unit, and a system of ducts is arranged to continuously lubricate the rotor, and by correlating the pressure of the fuel and oil, admixing of the two at the rotor is prevented.

For a more detailed understanding of the invention, reference is now made to the several drawings wherein like reference characters designate like parts throughout.

*General Arrangement*

In the form of invention illustrated, the device comprises a housing composed of blocks 10 and 11 (FIGURES 1 and 2) which are secured together in alignment by bolts 12, the housing being provided with flanges or feet 13 by means of which the unit may be mounted on a support, such as the engine itself. Obviously, various other mounting arrangements could be employed; and the arrangement shown is exemplary only. The blocks 10 and 11 are joined together by a continuous planar joint 14 which provides a fluid tight seal effective to confine a lubricant in the reservoir 15 which serves to enclose a number of the operating parts in a bath of oil and also furnishes oil for the rotor lubricating system to be hereinafter described. The reservoir 15 may be conveniently filled with oil through the filling opening and cap 16 and drained through outlet 17.

Fuel is delivered to the unit through fuel supply line 18 which will be connected to a suitable source of supply, such as a fuel tank (not shown). Upon entering the unit, the fuel will preferably pass through a filter 19 having an outlet passage 20 which delivers the fuel to the fuel pump 21 having a cup-shaped raceway 22. On its outlet side, the pump 21 delivers the fuel to main supply duct 23 which, as will be hereinafter explained, serves to deliver a portion of the fuel directly to the rotor assembly, indicated generally at 24, through duct 25 (FIGURES 1 and 3), or to the by-pass assembly, indicated generally at 26 (FIGURES 2 and 3) through by-pass duct 27.

An oil pump 28 is mounted immediately beneath the fuel pump 21, the oil pump having a cup-shaped raceway 29, the oil from reservoir 15 entering the pump 28 through inlet 30 (FIGURE 4) and passing from the pump through outlet 30a which conveys the oil to the rotor assembly 24 through ducts 31 and 32.

The two pumps and the rotor are driven in timed relation by means of the drive shaft 33 which, it will be understood, is operatively connected to the crankshaft of the engine so as to be driven in timed relation thereto. At its inner end the drive shaft 33 mounts a main driving gear 34 the hub of which is splined at 35 to the stub shaft 36 of the fuel pump 21. The teeth of driving gear 34 mesh with both rotor drive gear 37 and lubricating pump drive gear 38, the drive gear 38 being splined, at 39, to the stub shaft 40 of lubricating pump 28. With this arrangement, it will be obvious that the fuel pump 21, the lubricating pump 28, and the rotor drive gear 37 will all be driven in timed relation to each other and, since the drive shaft 33 is adapted to be driven in timed relation to the crankshaft of the engine, the named components of the distribution system will also be driven in timed relation to the engine crankshaft. As will be clearly apparent from FIGURE 1, the gears 34, 37 and 38 are all contained within portions of the oil reservoir 15 and hence are bathed in oil; and it is to be further understood that the various parts will be provided with suitable packing glands, gaskets and the like to prevent oil leakage.

*The Rotor Assembly*

As best seen in FIGURES 11 through 15, the rotor assembly comprises a rotor 50 which is a relatively thick-walled cylindrical shaft adapted to be surrounded by a split sleeve 51 composed of a lower half 51a and an upper half 51b which serve to journal the rotor in the body block 11 for both rotary and axial movement. As best seen in FIGURE 12, the outer surface of the lower half 51a of the split sleeve is provided with a longitudinal channel 52 having elongated slots 53 which open inwardly through the sleeve for direct communication with the rotor 50. When the lower sleeve half 51a is positioned in the housing 11, the channel 52 will be in communication with the primary fuel duct 25 so that fuel will be delivered to the rotor at longitudinally spaced apart points through the slots 53.

In the embodiment illustrated in FIGURES 11 through 15, the lower half 51a of the split sleeve is provided with two such spaced apart slots 53 and the rotor is provided with a pair of correspondingly spaced apart annular grooves 54 which communicate with the slots 53. The length of the slots 53 is such that each slot will be in communication with its corresponding annular groove during maximum axial movement of the rotor relative to the split sleeve, it being understood that the split sleeve is fixedly secured in the housing 11.

Each of the annular grooves 54 is provided with an identically formed pocket 55, the pockets being spaced circumferentially on the rotor so that their leading edges in terms of the direction of rotation correspond angularly to the spacing of the intake strokes of the engine. For example, with a four cylinder, four cycle engine, the leading edges of the pockets 55 will be 90° apart measured on the circumference of the rotor, and for a uniformly spaced series of equal fuel deliveries, two such axial spaced pockets are required where the outlet ports which receive the fuel from the pockets in the rotor are formed on diametrically opposite sides of the split sleeve. That is, and with reference to FIGURES 13 and 14, a longitudinal edge of each of the sleeve parts 51a, 51b is provided with a pair of milled or cut-out areas which, when the sleeve parts are juxtaposed, define elongated outlet ports 56 extending axially along opposite sides of the rotor in alignment with the pockets 55. The outlet ports 56, as can be clearly seen in FIGURE 17, communicate with passageways 57 which are adapted to be connected through tubing 58 to the engine cylinders, fuel injection nozzles or the like.

A delivery of fuel is made to the engine each time a pocket passes an outlet port. The times of beginning and ending the deliveries depend upon the shape and form of the pockets 55, as determined by the distance between their leading and trailing edges, so termed in reference to the direction of rotor rotation. Any selected performance desired with respect to the deliveries is obtained by the placement, shape and size of the pockets 55, and the suitable timing of rotor rotation with respect to crankshaft rotation and hence piston positions. In all cases, the number of outlet ports 56 is equal to the number of cylinders being supplied, and the number of pockets 55 is determined by the relationship between the speed of rotation of the rotor and the engine crankshaft. Again, using a four cylinder, four cycle engine as an example, if the rotor is turning at one-half engine crankshaft speed, two pockets are required; but if the rotor speed is one quarter the engine crankshaft speed, then four pockets are required. In all cases, with the exception of the case in which the rotor is turning at crankshaft speed, in which event only one pocket with a circumferential length equal to 180° is possible, the pockets need not be placed in regular order along the length of the rotor, it being required only that the sequential spacing of the pockets be uniform to achieve evenly timed and spaced deliveries. Single cylinder engines form a special case in which one outlet port is matched with one pocket except in an instance where the rotor is turning at one quarter crankshaft speed, in which event the single outlet port is matched with two pockets.

The rotor 24 is also movable axially relative to the split sleeve 51 to regulate and vary the areas of outlet ports 56 made available for the flow of fuel from the pockets 55. Axial movement of the rotor is achieved and controlled by means of a cam 59 (FIGURES 1 and 2) fastened on shaft 60. This cam acts upon the rotor through tappet 61 which bears against one hub of spur gear 37 and forces the rotor against the compression of return spring 62 which surrounds the reduced end 63 of the rotor, the spring 62 bearing against the plug 64 at one end and bearing ring 65 at the other. The threaded plug 64 also serves to force a sleeve 66 against the end of split sleeve 51 to prevent endwise movement thereof, the key 67 serving to lock the sleeve parts against rotation.

The main driving gear 34, which meshes with rotor drive gear 37, is of sufficient width to permit rotor gear 37 to move laterally under the influence of tappet 61, thereby permitting axial movement of the rotor with its driving gear in continuous meshing contact with the main driving gear 34. The gear 37 is provided with a splined stub shaft 68 which engages in a mating slot in the rotor.

The size of the outlet ports 56, formed at the junction of the two halves of the split sleeve 51 is varied by means of the sliders 69 (FIGURE 14) which form a very close sliding fit within the outlet ports. The sliders are mounted on split rings 70 which are received in annular slots 71 in the rotor 50, the slots 71 acting to move the sliders axially with the rotor. The sliders have a dual function in that they both form one side of the outlet ports 56 and also serve to keep these ports free from obstructive accumulations. In the completely shut-off position of the rotor (FIGURE 2) the sliders completely close the areas of outlet ports 56 in the path of pockets 55. As the rotor is moved axially, the sliders move with it and create rectangularly shaped outlet openings in communication with the pockets, the size of the outlet openings varying in proportion to the axial movement of the rotor. Split rings 70a (FIGURE 15) fill the remaining circumference of the annular slots 71.

*The Throttle Control*

Figure 2:
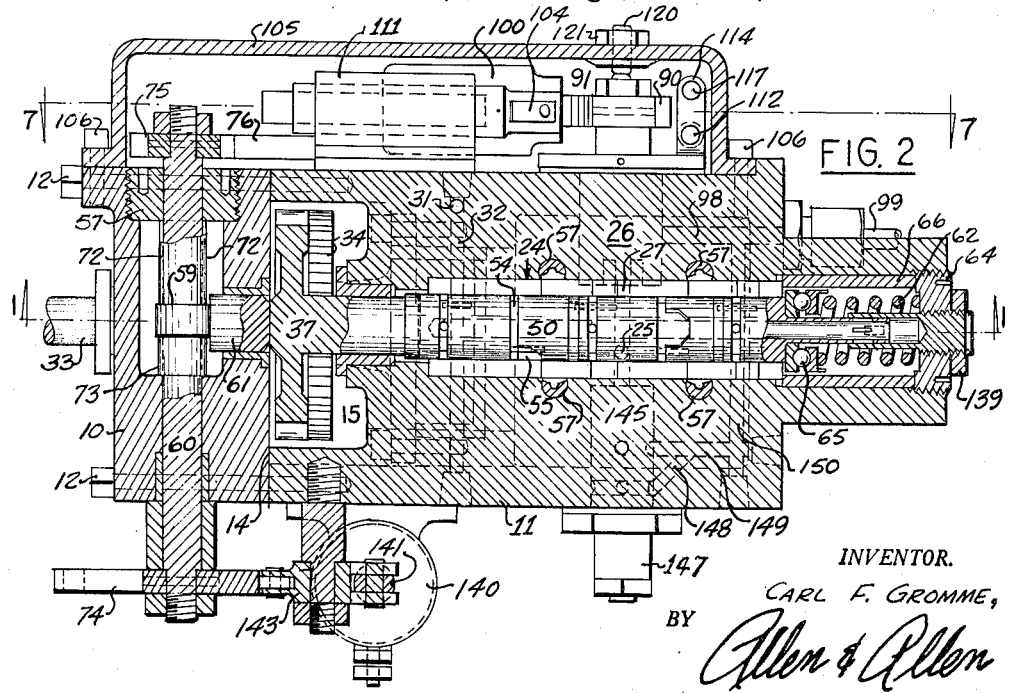
FIGURE 2 is a horizontal section taken on line 2—2 of FIGURE 1.

Shaft 60, which mounts rotor moving cam 59, is journaled in body block 10 and is held against axial movement by sleeves 72 and 73 (FIGURE 2). A throttle lever 74 is pinned to one end of the shaft 60 and a segment gear 75 is pinned to its opposite end, each in a definite angular relation to the cam 59. Thus, any movement of the throttle 74 is transmitted to both cam 59 and segment gear 75.

Referring now to FIGURE 7, the segment gear 75 meshes with larger segment gear 76 which pivots freely on pin 77. Pinned or otherwise securely fastened to segment gear 76 is a smaller double ended segment gear 78 which meshes simultaneously with an upper rack 79 and a lower rack 80 of a mechanism which serves to actuate the by-pass valve. Thus, when shaft 60 is turned the entire set of segment gears is set in motion and racks 79 and 80 are moved in opposite directions. Spring 81 attached to body block 10 assists in returning the throttle assembly to the idle or shut off position. The total extent of such movement is limited by the stop in 82, also set in body block 10.

*The By-Pass Assembly*

This assembly consists of a segment gear 90 meshing with by-pass rack 91 (FIGURES 3 and 7), the segment gear 90 being fixedly secured to a shaft 92 forming a part of the inner by-pass member 93 which is of cylindrical configuration and fits snugly within the bore of a flanged outer by-pass member 94. Inner by-pass member 93 surrounds a chamber 95 in communication with fuel supply duct 27 which, it will be remembered, is in communication with fuel pump 21. As best seen in FIGURES 5 and 6, the inner by-pass member 93 is provided with a shaped by-pass port 96; and the outer by-pass member 94 is provided with a rectangular port 97. The flow area between the two ports is controlled by rotating either by-pass member 93 or 94 relative to the other, the two acting as a valve. As will be clear from FIGURE 6, port 96 is so configured that the flow therethrough goes from a constant minimum, gradually increases to a constant maximum, and then decreases for the remainder of its length. Fuel flowing through the by-pass members will pass into return duct 98 which serves to return the fuel to the supply line 18 through fuel return line 99 (FIGURES 1 and 2).

The relative positions of by-pass port 96 and port 97 is controlled by segment gear 90 and rack 91, which in turn are controlled by the action of throttle 74. As lower rack 80 of the by-pass control moves to the right, as seen in FIGURE 7, it tends to move the entire assembly consisting of rack 91, spring housing 100, spring 101, and hydraulic cylinder 102. If no opposing force is encountered, gear 90 will move in a counterclockwise direction and thereby effectively open the flow area defined by by-pass port 96 and port 97.

Arrangement has been made, however, to provide an opposing force of short duration. To this end, one end of upper rack 79 acts as the piston in hydraulic cylinder 102, and, as the rack 80 moves to the right, rack 79 moves to the left; and meeting the resistance of compression of the fluid in cylinder 102, arrests the movement of the entire assembly. Lower rack 80 is, however, free to move relative to housing 100 and, in so doing, compresses spring 101. The fluid in the hydraulic cylinder 102 escapes at a predetermined rate through the small orifice 103. A relief valve 104 is provided in the event excessive resistance is encountered.

By means of the arrangement just described, the flow area defined by the by-pass port 96 and port 97 is reduced in area, or at least maintained without an increase in area, while the fuel outlet ports 56 are being increased in size by the axial movement of the rotor 50 under the influence of throttle 74. The arrangement thus provided for an increased rate of flow of fuel to the rotor during periods of acceleration, followed by an automatic readjustment of the relative port areas to provide for normal running conditions.

The parts of the by-pass assembly outside the main body block are housed within a cover 105 (FIGURES 2 and 8) fastened by bolts 106 to the main housing. The chambers so formed is partially filled with oil for hydraulic and lubricating purposes through filling opening 107 (FIGURE 7). Preferably, the oil level within the housing or cover 105 will cover the hydraulic cylinder 102 but will terminate below the plug 108 (FIGURES 3 and 4). It may be observed also that guiding brackets 109 and 110 (FIGURE 7) will be provided to support the racks 80 and 91, respectively, to assure their proper alignment; and in addition, a sleeve 111 will be provided to guide movement of hydraulic cylinder 102.

*Manual Control of By-Pass Port*

It is also desirable to provide for the manual control of the flow area of the by-pass port for adjustment purposes and also for regulation of fuel flow under certain conditions, such as cold starting or warm-up. This is accomplished by changing the position of outer by-pass member 94 while leaving inner by-pass member 93 unchanged. Movement of outer by-pass member 94 is accomplished by means of adjustment rod 112, best seen in FIGURES 3, 7 and 8, one end of which is threaded through the cover 105 and provided with a control lever 113. The lower end of the rod 112 contacts a bracket extension 114 which is a part of the outer by-pass member 94. A spring 115 extending between the under side of extension 114 and a bracket 116 serves to bias the outer by-pass member 94 in a clockwise direction (FIGURE 7), which will tend to juxtapose the port 97 to the by-pass port 96. Adjustable rod 117 acts as a stop limiting the clockwise movement of the outer by-pass member. It may be noted, also, that the bracket 116 may be positioned to serve as a stop limiting the movement of rack 91 (see FIGURE 7).

In operation, when the adjustment rod 112 is turned so as to cause the outer by-pass member 94 to move in a counterclockwise direction, a portion of the by-pass port 96 will be closed, thereby reducing the open flow area between the by-pass members. When this occurs with no simultaneous reduction of the flow area of the outlet ports 56 in the rotor, an increased fuel delivery will result. It will be understood that the method of actuating adjustment rod 112 is optional and may be either manual, as shown, or it may be thermal, i.e. analogous to an automatic choke. The outer by-pass member 94 may be conveniently provided with a pointer 118 for judging or measuring the amount by which the outer by-pass member 94 has been rotated, the pointer being brought into view by removing the inspection plug 108.

Referring again to FIGURE 3, both the inner and outer by-pass members 93 and 94 are maintained in contact with the base seal 119 by means of the adjustable set screw 120 which is adapted to be locked in placed by means of lock nut 121. A spring 122 extends between the base seal 119 and a flanged seal 123 surrounding the outer by-pass member 94. Care must be taken in adjusting the by-pass members so that the degree of friction created does not cause the outer member to move against the resisting force of spring 115 when segment gear 90 is moved.

Rotor Lubricating System

As has already been pointed out, lubricating oil from the reservoir 15 passes through oil pump 28 and upwardly through ducts 31 and 32 to the rotor assembly. The latter duct is in communication with a longitudinal channel 130 in the lower half of split sleeve 51 (FIGURE 18) which channel has a plurality of slots 131 which extend through the sleeve and communicate with the annular grooves 132 (FIGURE 11), the arrangement being similar to that of the channel and slots supplying fuel to the grooves 54 and pockets 55. The grooves 132 are, however, in direct communication with the hollow center 133 of the rotor 50 through ports 134. Lubricant is thus circulated through the hollow center of the rotor, the lubricant passing through a plurality of slots 135 in the reduced end 63 of the rotor for return to the oil reservoir 15 through duct 136 (FIGURE 1).

An adjustable sleeve 137 is slidably received over the reduced end portion of the rotor; and this sleeve is provided with slots 138 which are so sized and spaced that when the sleeve 137 is placed over the end of the rotor, a portion of one of the slots 135 or the equivalent width in two of the slots 135 will remain continuously open. Relative adjustment can be made by means of the threaded nut 139 which surrounds the threaded end of sleeve 137 which, as will be clear from FIGURE 1, is also threadingly received in plug 64. With this arrangement, the flow area of the slots 135 will be controlled by the slots 138 and the axial position of the rotor; and as the rotor moves axially and its speed increases—accompanied by a concurrent increase in the speed of the oil pump—the flow area of the slots 135 will be increased proportionately.

The sliders 69 which, it will be remembered, control the area of the outlet ports 56, have their opposite ends arranged to terminate within the annular grooves 132, to thereby prevent the lubricating oil from being forced through the fuel outlet ports. In addition, the pressure of the lubricant balances the leakage of fuel between the rotor and the slit sleeve with a fluid of opposing pressure. That is, by adjusting the sleeve 137 while the engine is at idling speed, the pressure of the fuel and the lubricant can be balanced. Thus, any tendency of the fuel to migrate along the cylindrical walls of the rotor and enter the annular oil grooves 132 is resisted by the pressure of the oil, and vice versa. Similarly, oil is introduced into the annular grooves 71 which receive the split rings 70, 70a through ports 134a, thereby serving to lubricate the sliders and at the same time maintaining the pressure balance between the fuel and the lubricating oil.

The Operation of the Device

The operation of the distribution system is controlled by the throttle lever 74. While shown as a lever, it will be understood that any suitable mechanism may be used, provided adequate linkage to the air intake system of the engine is possible. In this connection, it may be observed that the air intake system forms no part of the instant invention and consequently has not been illustrated, although it will be understood that the two systems will be interconnected to provide the proper air-fuel ratio.

FIGURE 10 shows an arrangement by means of which the fuel supply is maintained during idling periods, but is completely shut-off when the engine ignition is off. The solid lines show the throttle in idling position. It is held there by current flowing through the solenoid 140 which moves the core 141 against the force of spring 142, and this pulls bell crank 143 downwardly against stop pin 144. The broken lines in the figure show the position of the throttle when the ignition has been turned off and the solenoid deenergized. Note that in this position the throttle 74 is slightly lowered, and this in turn moves the rotor actuating cam 59 so as to permit the rotor to assume fully shut-off position.

When the ignition switch of the engine is turned on preparatory to starting, the solenoid 140 will move the throttle to idle position which acts through cam 59 to effect a slight axial movement of the rotor 50, thereby partially opening the fuel outlet ports 56. Movement of the throttle to idle position also effects slight relative movement between the by-pass members 93 and 94. As the engine crankshaft is rotated by its starter, the fuel pump 21, the oil pump 28, and the rotor 50 all begin to rotate in timed relation. Fuel is thus caused to flow through ducts 23 and 25 to the rotor pockets; and at the same time oil is caused to flow through the ducts 31 and 32 to lubricate the rotor. The adjustment of the by-pass members 93, 94 is such that the required quantity of fuel will flow directly to the rotor, whereas the excess will flow through the by-pass port 96 for return to the source of supply through ducts 98 and return line 99. During cold starting or warm up, the fuel mixture may be enriched by means of the lever 113 which will rotate the outer by-pass member 94 relative to the inner by-pass member 93, thereby effectively decreasing the quantity of fuel flowing through the by-pass ducts and hence increasing the quantity of fuel delivered to the rotor.

As the engine speed is increased by movement of the throttle toward open position, the speed of rotation of the rotor and the pumps will be increased proportionately and the flow area of the by-pass port will be adjusted accordingly, depending upon the demands of the engine. If, for example, the throttle is rapidly moved from idle to fully advanced position, the increased demand will be met by the time delay characteristic of hydraulic cylinder 102 which retards relative movement between the inner and outer by-pass members so as to cause a greater proportion of the fuel to pass directly to the rotor rather than through the by-pass ducts. However, as the engine picks up speed and the fuel pump operates at a proportionately greater speed, the hydraulic cylinder will gradually permit adjustment of the quantity of fuel permitted to flow through the by-pass ducts.

When the throttle is retarded to reduce engine speed, the rotor will be released for axial movement toward the closed position in which direction the size of the outlet ports is greatly reduced; and the supply of fuel to the rotor will be decreased accordingly by the action of the by-pass members which will act to by-pass a greater proportion of the fuel. It has been found, however, that additional pressure regulation is necessary to accommodate instantaneous speed reductions. Since the speed of rotation of both the rotor and the fuel pump are directly related to the engine speed, deceleration will result in periods when both the outlet ports and the by-pass port are relatively small in area and the rate of flow from the fuel pump is high, with a corresponding increase in fuel pressure. In order to relieve such increased pressure, a relief valve 145 is provided in the main fuel duct 27. Adjustment of the pressure required to operate this valve is accomplished by means of spring 146 and set screw 147. Fuel passed through valve 145 is returned through ducts 148, 149 and 150 which pass the fuel to the return duct 98 for recirculation. Ducts 151 and 152 (FIGURE 3) form a secondary connection to the relief valve 145. It may be observed in passing that all of the various ducts (both fuel and lubricating) are drilled in the main body block and must be plugged. Preferably, such plugs will be provided with stems to fill the unused portions thereof. It may be further observed that any of these plugs is suitable for the attachment of pressure gauges for testing or checking purposes.

As should now be apparent, the instant device may be utilized to operate engines having a varying number of cylinders. While the rotor illustrated in FIGURE 11 is specifically designed for a four cylinder, four cycle engine, FIGURE 19 illustrates a rotor suitable for use in an eight cylinder engine, the rotor being provided with four axially spaced pockets 55a each of which serves a pair of outlet ports. Similarly, FIGURE 20 illustrates a rotor designed for a six cylinder engine, the rotor being provided with a series of three axially aligned pockets 55b arranged to serve a series of six outlet ports. It is also contemplated that the supply of fuel to the annular grooves 54 which supply the pockets 55 may be supplemented by providing a channel 52b in the upper sleeve half 51b, such channel communicating the annular grooves 54 through slots 53b, as will be clear from FIGURE 17. Such channel also serves to bleed entrained air from the system.

Additional modifications may be made in the invention without departing from its spirit or purpose, and consequently I do not intend to be limited excepting in the manner set forth in the claims which follow.

I claim:

1. A fuel distribution system comprising a housing, a cylindrical rotor rotatably mounted in said housing, said rotor having at least one fuel pocket therein, at least one outlet port for each such fuel pocket positioned to receive fuel from such pocket during each rotative cycle of said rotor, said rotor being axially movable to vary the flow area between each outlet port and its coacting pocket, a constant delivery fuel pump, means for driving said rotor and said fuel pump in timed relation, means for delivering fuel from said pump to each pocket in said rotor, by-pass means for diverting a portion of the fuel passing through said delivery means, said by-pass means comprising a pair of telescoping relatively movable by-pass members each having a coacting port therein, said by-pass members, upon relative movement thereof, acting to vary the flow area of said coacting ports and hence the quantity of fuel diverted therethrough, throttle means operatively connected to said rotor and to one of said by-pass members and operative to effect axial movement of said rotor to vary the flow area between each outlet port and its coacting pocket and simultaneously effect relative adjustment of said by-pass members to vary the quantity of fuel diverted therethrough, and means for effecting relative adjustment of said by-pass members independently of said throttle means, said last named means being operatively connected to the other of said by-pass members.

2. The device claimed in claim 1 including time-delay means in the connection between said throttle and said by-pass means.

3. The device claimed in claim 2 wherein said time-delay means comprises an hydraulic cylinder having a bleeder port therein by means of which said cylinder may be evacuated.

4. A fuel distribution system comprising a housing having a cylindrical bore therein, a sleeve in said bore, a rotor received in said sleeve and mounted for both rotative and axial movement, an elongated fuel channel in the outer surface of said sleeve extending lengthwise thereof, a plurality of spaced apart slots in said channel in communication with said rotor, said rotor having a corresponding number of annular grooves therein in communication with said slots, a fuel pump, a duct for delivering fuel from said pump to the channel in said sleeve for distribution to said annular grooves, each of said annular grooves having a fuel pocket in communication therewith, a plurality of outlet ports in said sleeve positioned to receive fuel from said pockets during each rotative cycle of said rotor, said rotor also having a second set of annular grooves spaced axially with respect to said first named annular groove, each of said second set of grooves receiving a slider, said sliders also being slidably received in the outlet ports in said sleeve, whereby, upon axial movement of said rotor, said sliders will act to vary the flow area of said outlet ports, means for driving said rotor and said pump in timed relation, by-pass means for diverting a portion of the fuel passing through said duct, said by-pass means being adjustable to vary the amount of fuel diverted therethrough, and throttle means operatively connected to said rotor and to said by-pass means, said throttle means acting to effect axial movement of said rotor and simultaneously adjust said by-pass means.

5. The device claimed in claim 4 wherein said rotor includes a third set of axially spaced annular grooves, wherein said sleeve has a second longitudinal channel in the outer surface thereof, said channel having spaced apart slots therein in communication with said third set of annular grooves, and wherein said housing incorporates an oil reservoir and an oil pump for delivering oil to said second channel for distribution to said rotor through said third set of annular grooves.

6. The device claimed in claim 5 wherein said rotor is hollow, wherein said third set of annular grooves is in communication with the hollow center of said rotor, and wherein means are provided to return oil flowing through said third set of annular grooves and into the hollow center of said rotor to said oil pump for recirculation.

7. The device claimed in claim 6 wherein said last named means includes a second sleeve slidable over one end of said rotor, wherein the said end of the rotor and said sleeve each have slots therein, and wherein said sleeve is adjustable relative to the end of said rotor, whereby to juxtapose said slots in varying degrees to thereby regulate the quantity of oil flowing through said rotor.

8. The device claimed in claim 7 wherein said first named sleeve is formed in two halves and wherein said outlet ports are defined along the meeting edges of said halves so as to lie on diametrically opposite sides of said rotor.

9. A fuel distribution system comprising a housing, a rotor rotatably mounted in said housing, said rotor having a plurality of axially spaced apart fuel pockets therein, means including a constant volume fuel pump for delivering fuel to the pockets in said rotor, outlet ports in said housing positioned to communicate with said pockets during each rotative cycle of said rotor, said rotor also being axially movable to vary the areas of said outlet ports in communication with said pockets, spring means biasing said rotor axially in one direction, a shaft mounting a cam operative upon rotation of said shaft, to effect axial movement of said rotor against the resistance of said spring, a throttle operatively connected to said shaft to effect rotation thereof, by-pass means operatively connected to said fuel pump for diverting a portion of the fuel delivered thereby, said by-pass means being adjustable to vary the quantity of fuel diverted therethrough, and means operatively connecting said by-pass means to said shaft, whereby rotation of said shaft will effect adjustment of said by-pass means, said last named means comprising a segment gear on said shaft in meshing engagement with a second segment gear operatively connected to a double segment gear the opposite sides of which engage a spaced apart pair of racks, the arrangement being such that the movement of the double segment gear will effect movement of the racks in opposite directions, a third rack in meshing engagement with a third segment gear operatively connected to said by-pass means, said third rack forming a part of a yoke-like fitting for receiving said pair of racks, one end of said yoke comprising a fluid cylinder adapted to surround one of said last named racks, said last named rack terminating at one end in a piston adapted to be received in said fluid cylinder, the remaining end of said yoke defining a spring housng in which an end of the remaining rack is received, and spring means in said housing acting to bias said remaining rack in one direction.

10. A fuel distribution system comprising a housing having a bore therein, a sleeve in said bore, a rotor rotatably and axially movable within said sleeve, a constant volume fuel pump, a constant volume oil pump, means for driving said rotor and said two pumps in timed relation, means for delivering fuel from said fuel pump to said rotor, said rotor having fuel pockets therein adapted to be brought into communication with outlet ports in said sleeve during each rotative cycle of said rotor, means for delivering oil from said oil pump to said rotor, said rotor having ports therein in communication with a hollow center through which the oil is adapted to flow, means for returning oil flowing through said rotor to said oil pump for re-circulation, means associated with said rotor and operative, upon axial movement thereof, to vary the size of said outlet ports, by-pass means for diverting a portion of the fuel being delivered to said rotor, said by-pass means being adjustable to vary the quantity of fuel diverted therethrough, means for returning the diverted fuel for re-circulation by said fuel pump, and control means including a throttle operatively connected to said rotor and said by-pass means, said control means acting to effect axial movement of said rotor and simultaneous adjustment of said by-pass means.

11. The device claimed in claim 10 including means operative upon axial movement of said rotor to vary the quantity of lubricating oil flowing through said rotor.

12. The device claimed in claim 11 including means operative to effect adjustment of said by-pass means independently of said control means.

13. The device claimed in claim 12 including pressure relief means in association with the means delivering fuel to said rotor.

14. The device claimed in claim 13 including time-delay means in the connection between said control means and said by-pass means.

References Cited in the file of this patent

UNITED STATES PATENTS

| | | |
|---|---|---|
| 2,087,296 | Parsons | July 20, 1937 |
| 2,161,507 | Egersdorfer | June 6, 1939 |
| 2,385,089 | Lerner | Sept. 18, 1945 |
| 2,391,221 | Beeh | Dec. 18, 1945 |
| 2,453,196 | Clark | Nov. 9, 1948 |
| 2,474,396 | Groves | June 28, 1949 |
| 2,592,281 | High | Apr. 8, 1952 |
| 2,624,326 | Fiser | Jan. 6, 1953 |
| 2,750,933 | Lauck | June 19, 1956 |
| 2,824,687 | Osterkamp | Feb. 25, 1958 |
| 2,834,376 | Hughes | May 13, 1958 |